(No Model.) 2 Sheets—Sheet 2.
I. P. LAMBING.
EXCAVATING APPARATUS.
No. 476,750. Patented June 7, 1892.
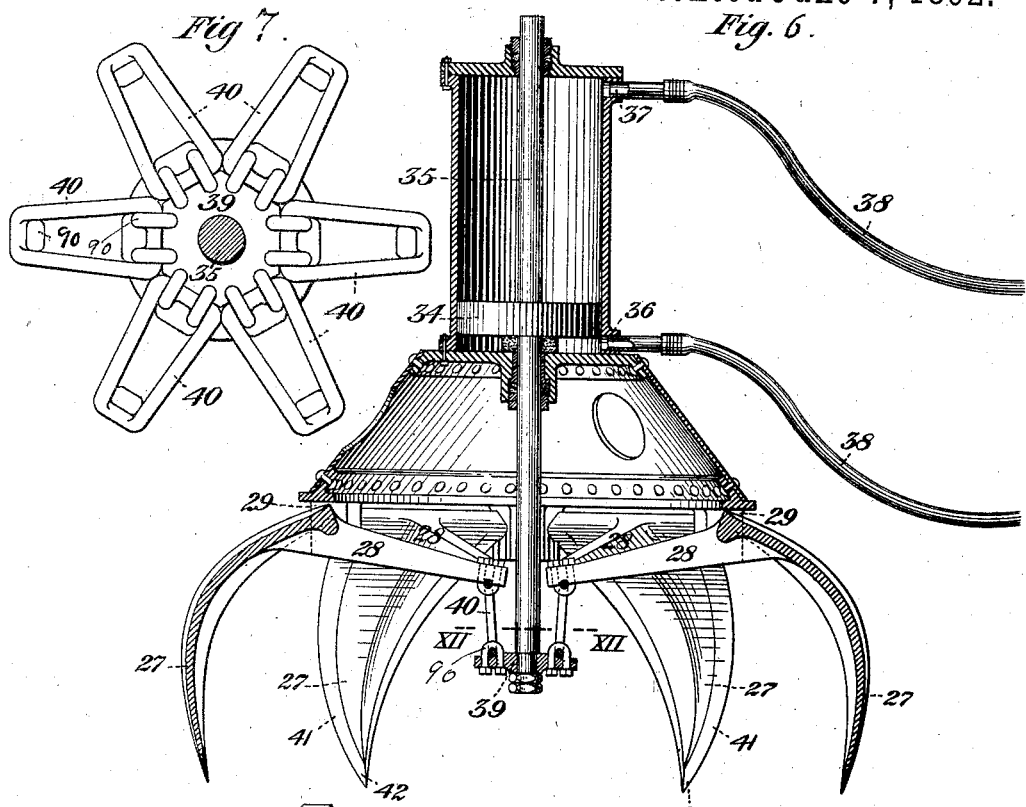
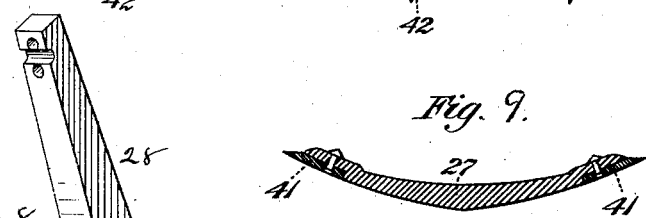
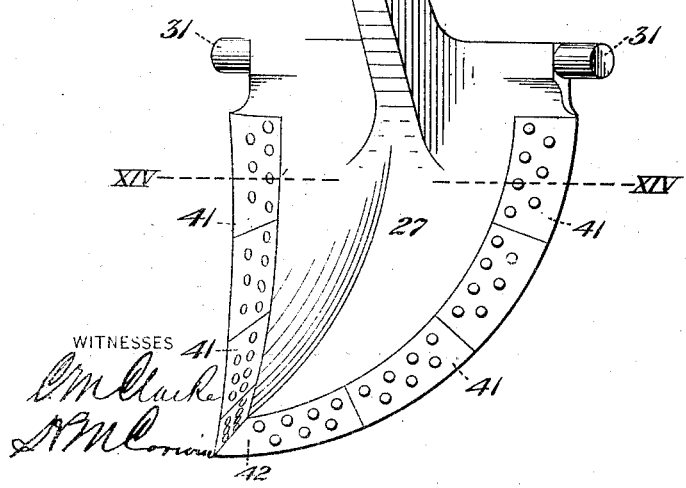
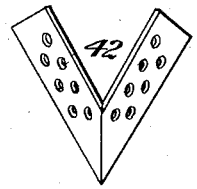
INVENTOR.
Isaac P. Lambing
by W. Bakewell & Sons
his Attorneys.
WITNESSES

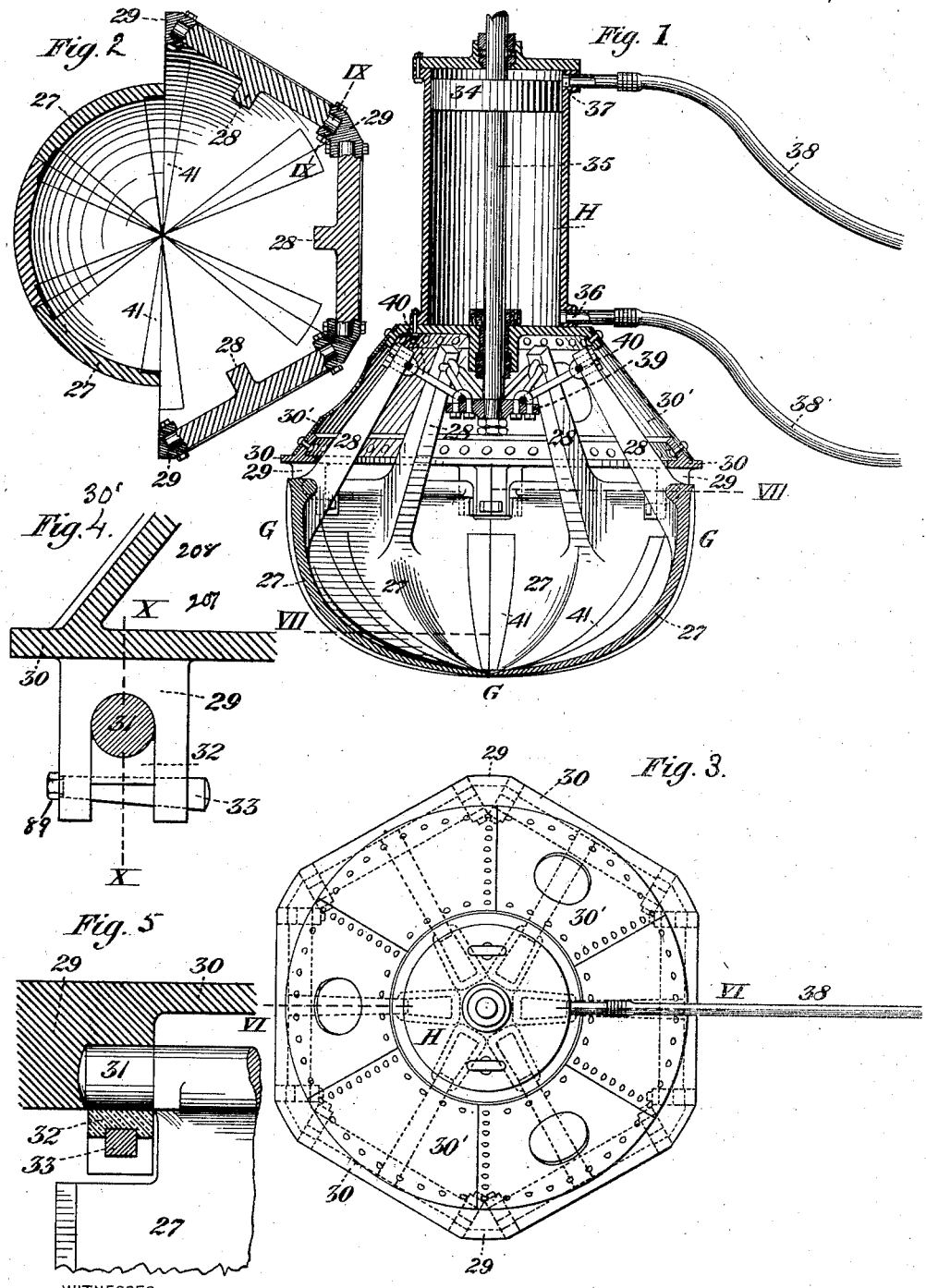

United States Patent Office.

ISAAC P. LAMBING, OF GOLDEN, COLORADO.

EXCAVATING APPARATUS.

SPECIFICATION forming part of Letters Patent No. 476,750, dated June 7, 1892.

Application filed March 31, 1891. Serial No. 387,117. (No model.)

*To all whom it may concern:*

Be it known that I, ISAAC P. LAMBING, of Golden, in the county of Jefferson and State of Colorado, have invented a new and useful Improvement in Excavating-Apparatus, of which the following is a full, clear, and exact description.

My invention consists in certain improvements, as hereinafter described, upon an excavator for which Letters Patent No. 403,762 were granted to me on May 21, 1889.

In the drawings forming part of this specification, in which like numerals and letters indicate corresponding parts, Figure 1 is a vertical section, on the line VI VI of Fig. 3, of the excavator and steam or air cylinder by which its shovels are operated, with the shovels closed. Fig. 2 is a horizontal cross-section on the line VII VII of Fig. 1. Fig. 3 is a top view of the excavator. Fig. 4 is a vertical cross-section on the line IX IX of Fig. 2, showing one of the hinges which connects the shovels to the frame of the excavator. Fig. 5 is a side view, partly in section, of the hinge shown in Fig. 4. Fig. 6 is a vertical sectional representation of the excavator and steam or air cylinder by which its shovels are operated, differing from Fig. 1 in that the shovels are open. Fig. 7 is a plan view of the series of links by which the upper end of the arm of each shovel is connected with the cross-head at the end of the piston-rod, by which the shovels are opened and closed. Fig. 8 is a detached perspective representation of one of the shovels of the excavator. Fig. 9 is a cross-section through the shovel on the line XIV XIV of Fig. 8, showing the shape of the shovel and the mode of attaching the cutters. Fig. 10 is a front view of the shoe which forms the lower extremity of the shovel.

The excavating portion consists of a number (say six) of sections forming, when opened, pointed segmental shovels 27, each having a concave back of the shape shown in Figs. 8 and 9, and when closed forming a hemispherical bucket G. (See Fig. 1.) Each segmental shovel has an inwardly-bent lever-arm 28 rigidly attached to or made in one with it, and at the top of the shovel and at the base of its arm it is journaled to a lug 29, depending from and formed in one piece with a ring 30 at the bottom of the cone-shaped cover or skirt 30′, which forms the upper part of the excavator-bucket. The skirt 30′ should be made of boiler-plate and very strong. Each lug 29 is slotted to receive the short journal 31 at the shoulder or top of the shovel 27, and the lower bearing 32 is kept in place by a removable square key 33, which is held in place by a jam-nut, as shown in Fig. 9. The bottom of the cone-shaped cover 30′ of the excavator-bucket is riveted to the ring 30, as shown in Fig. 1, and its upper end is riveted to the base-plate or head of a cylinder H, which has a piston 34 and a piston-rod 35, which passes down into the cone 30′ of the bucket through a stuffing-box. It is very important that this ring 30 should be very strong and the connections of the shovels to the ring very secure, as a very great strain comes on this part both when the shovels are forcibly closed after they have entered the ground and when raised up with the mass of earth, stones, &c., contained therein. I therefore use a ring having a flat horizontal base portion, an integral annular flange rising from the same and inclined inwardly, and a series of lugs depending from the lower side of the base portion, the whole constituting a solid steel casting.

The cylinder H has ports 36 37—one at each end—for the admission and exhaust of steam or compressed air, so as to operate the piston, such admission and exhaust of steam or compressed air being effected through a flexible pipe 38, leading to a suitable steam or compressed-air supply. Attached to the lower end of the piston 35 and within the cone 30′ is a cross-head 39, (see Figs. 1 and 7,) to which the upper extremity of each shovel 27 is connected by a link 40, the connections with the links being made by staple-shaped straps passing through the links and secured by nuts. When, therefore, the piston-rod 35 is depressed, it draws the lever-arms 28 downward and inward, causing the pointed segmental shovels 27 to open and assume the position shown in Fig. 6. These shovels are pivoted by the journals 31, situate at the top of the shovels on a line with the base of the lever-arms 28. When closed they fit snugly together. These shovels have an inward curvature in the line XIV XIV of Fig. 8, as is more clearly shown in Fig. 9, where the upper line represents the curvature of the outside of the shovel. This inward curvature is important, as it greatly facilitates the insertion and withdrawal of the shovel into and from the ground, thus enabling the shovels to be used in hard material, as the concave portion of the outer edge of the shovel does away with the friction incident to the use of the old or convex form. The outer edges of the shovels may be composed of cutter-plates 41, of hard steel, removably attached by rivets (see Figs. 8 and 9) to the shovels, so that they may be replaced if broken or sharpened when they get dull by use. The toe 42 may be in one piece, as shown in Fig. 10. When the piston-rod 35 is raised, it raises the cross-head 39, and, raising the lever-arms 28, it causes the shovels to assume the position shown in Fig. 1, closing the bucket. When the excavator is lowered, the shovels are opened, as in Fig. 6, with their toes pointing downward almost in a vertical position. These excavators are so heavy and their shape and curvature are such that they readily sink into the ground, and when the steam is let into the lower end of the cylinder it raises the piston, with the cross-head, which is connected to the arms of the shovels by the links, and the shovels close upon the mass of clay or gravel and stones within the circle of the shovels, raising up the mass and inclosing it as in a basket. The excavator is then raised to a sufficient height, and, the boom being turned until the loaded excavator comes over the place where it is to deposit its burden, the excavator is opened by depressing the piston of the cylinder, thus lowering the lever-arms 28 and causing the shovels to assume the position shown in Fig. 6, thus opening the bucket and discharging the load.

I claim—

1. In an excavator, the combination, with an air or steam cylinder, piston, and piston-rod, and segmental shovels having arms directed inward and upward to a point above their attachment to the cross-head or piston-rod, of a strong metallic ring having depending lugs to which the lever-arms of the shovels are pivoted, said ring being connected with the piston-cylinder, substantially as and for the purposes described.

2. In an excavator, the combination of a steam or air cylinder, piston, and piston-rod, a frame for supporting the excavating-shovels, consisting of a metallic skirt attached to the lower end of the cylinder, a ring at the base of the skirt, lugs attached to and depending from said ring, and segmental shovels pivoted to said lugs and having inwardly-bent lever-arms connected with the piston-rod, substantially as and for the purposes described.

3. In an excavator, the combination of a series of pointed segmental shovels, each having an inward curvature across or in a horizontal plane and an outward longitudinal curvature, with a ring or frame, to which they are pivotally connected, and arms connected with the piston-rod of an engine placed above the ring or frame which supports the shovels, substantially as and for the purposes described.

4. In an excavator, the combination, with a base-ring having an upper integral flange and depending lugs, of a cover secured to the upper flange, shovels pivoted in the lugs, and means for operating said shovels, substantially as and for the purposes described.

In testimony whereof I have hereunto set my hand this 14th day of March, A. D. 1891.

ISAAC P. LAMBING.

Witnesses:
W. B. CORWIN,
O. B. PAINE.